Nov. 2, 1954  P. D. WURZBURGER  2,693,375
DOUBLE-BITING RING PIPE COUPLING
Filed Jan. 23, 1953
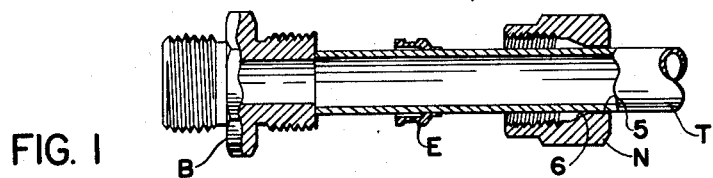
FIG. I
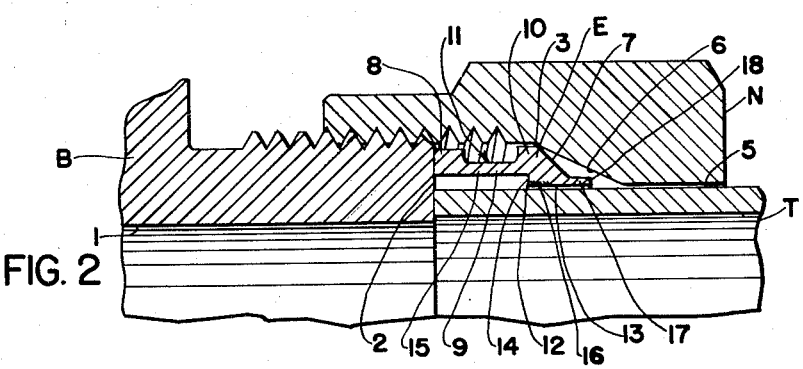
FIG. 2
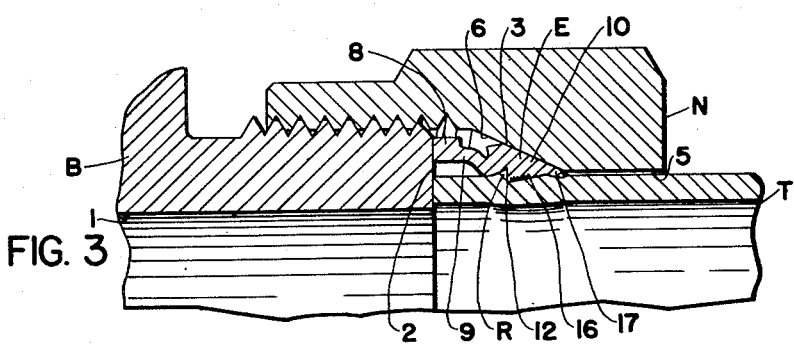
FIG. 3
INVENTOR.
PAUL D. WURZBURGER
BY
ATTORNEYS

United States Patent Office 2,693,375
Patented Nov. 2, 1954

2,693,375

DOUBLE-BITING RING PIPE COUPLING

Paul D. Wurzburger, Cleveland Heights, Ohio

Application January 23, 1953, Serial No. 332,953

4 Claims. (Cl. 285—122)

This invention relates to improvements in the art of coupling and more particularly to tube or pipe couplings and fittings and the coupling elements thereof, and comprises an improvement upon and continuation in part of my co-pending application Serial No. 160,347, filed May 5, 1950.

It is among the objects of my invention to improve upon my own and other prior types of couplings and joints particularly as to fluid sealing and mechanical gripping virtues and facilities and, in addition, to provide the facility of a "close" coupling whereby the tube, piece or pipe to be coupled can be joined to or disconnected from the body or instrumentality with which it is connected or associated without substantial longitudinal motion or displacement; to provide a novel and improved sealing and gripping element to seal and grip the tube, to be coupled more effectively and without, or with less hazard, of constricting thin-walled tube undesirably or cutting into the wall of the tube more deeply than is necessary or desirable; to provide a coupling with a more efficient cutting edge and action and correspondingly lessened wrench torque; to provide a coupling which during the operation of making the joint will reflect a "feel" to the operator that the joint has been completed as by a marked increase in wrench torque; to provide a coupling that does not require the provision of a flared mouth or conical camming surface interiorly of the body member; to provide a coupling element useful in association with standard or flanged valve bodies and other instrumentalities without specially machining the same; to provide a coupling that is highly resistant to failure or deterioration from the deleterious influences of vibration; to provide a coupling having an improved cutting edge adapted to turn up a ridge of appreciable size from the wall of the tube or piece to be coupled more efficiently and with a better cutting action and also to restrict the depth of the cut and the size of the ridge and at the same time to grip and confine the ridge and to grip the tube adjacent the ridge and at a spaced distance from the cutting edge whereby to enhance the grip upon the tube and more firmly secure the tube mechanically and effect a more complete fluid seal and withal to limit more effectively the constriction of the tube incident to making the sealed joint.

Other objects include the provision of a gripping and sealing element within which actions and motions may be induced to effect a desirable apportionment of tube surface cutting, gripping, sealing, and vibration resistant functions. Another object is to provide a sealing and tube gripping element at least part of which may take a relatively fixed position with relation to the tube or pipe with which it is to be associated in the first instance and may by displacement and deformation of other parts of the element be worked into firm mechanical gripping and fluid sealing relation to the tube for permanent attachment thereto for repeated connections and disconnections.

Another object is to provide a self-contained coupling element which within itself under the influence of longitudinally acting compressive forces converts and distributes those forces into gripping, cutting, and sealing forces and motions to embrace the tube to be coupled and to substantially integrate the same in relation thereto. Other objects are to provide better tipping action of the edge-carrying ring part of the coupling element and an improved address of the cutting edge to the tube wall and a better distribution of radial and axial components of force to effect the tube cutting and gripping actions; to provide less distortion of the tube wall; to prevent outward expansion of the forward end of the coupling element; to provide a vibration resistant grip on the tube without interference with the tube cutting and sealing action and to provide a triple grip and seal upon the tube with a positive cut or locked engagement and a vibration resistant bearing between the tube and the coupling element.

Other objects include the provision of means of accomplishment of the foregoing objects that are economical of manufacturing costs and facile, enduring and advantageous in use.

Other objects and advantages will more fully and at large appear from the following description of a preferred form of my invention, reference being had to the accompanying drawings in which:

Figure 1 is an elevation partly in longitudinal section of an exemplary preferred form of my invention with the parts in pre-assembled relation.

Figure 2 is an enlarged fragmentary longitudinal section similar to Figure 1 with the parts in assembled and working relation but prior to the working thereof.

Figure 3 is a view corresponding to Figure 2 with, however, the parts worked and in coupled and joined relation.

Referring now to the form of my invention shown in Figures 1 to 3 inclusive, there is shown an externally threaded body B to the rearward end of which the tube T is to be coupled and joined by the coaction of the internally threaded nut N between which and the body the coupling element E is worked into tube gripping and sealing relation and into sealing relation with the rearward end of the body. The body B has a bore 1 coextensive with the bore of the tube T and of corresponding inside diameter. The rearward face 2 of the body, may, to take advantage of my invention, be substantially flat and planar and lie normal to the axis of the bore of the body and thereby facilitate a "close" coupling. The rearward face 2 of the body serves as a longitudinal or axial abutment for the forward end of the tube T restraining it against axial movement toward the body and also serves as an abutment for the forward end of the coupling element E holding the forward end of the element against forward axial movement.

The nut N has a bore 5 coaxial with the axis of the bore of the body and coaxial of the tube and closely and freely encompassing the tube, and for particular coaction in my invention the nut has a forwardly facing inclined, preferably substantially conical female seat or camming shoulder 6 engageable with the complementarily formed, but more steeply pitched male shoulder 7 on the outer and rearward end of the coupling element E. For the most advantageous practice of my invention I prefer that the female shoulder 6 of the nut be pitched at about 25° to 30° whilst the male shoulder 7 of the coupling element be pitched at about 45° to provide a differential angle of between about 15° to 20° to facilitate the working of the element and engagement of the tube thereby in particulars and with results more fully described below. The nut N, and body B are otherwise shown in their conventional forms and I shall use the terms nut and body to comprehend equivalent instrumentalities such as a flanged body and a flange ring specifically shown in my co-pending application, such a flanged body having, however, a rearward, preferably flush, face corresponding to the face 2 and the flange ring having a camming shoulder corresponding to the shoulder 6, both for coaction with the element E and tube T as suggested above and more fully described below.

The coupling element E comprises a rearwardly disposed annular relatively thick ring part 10 having the outward and rearward inclined, preferably substantially conical surface 7 mentioned above, and comprises a forwardly disposed relatively thin walled tubular or sleeve part 11 with an annular thickened anchor portion or abutment 8 at its forward end; the ring part engaging the nut; and the anchor portion at the forward end of the sleeve part engaging the body. The ring and sleeve parts are preferably integrally formed as shown, preferably from rod stock or tubing, so as to have or be susceptible or acquiring the qualities of resilient yielding strength in the sleeve and constrictable toughness and hardness in the ring part to perform their respective offices and functions within my invention.

A main function of the ring part is to grip and engage the tube T with a strong mechanical grip and preferably also with a fluid tight seal. A main function of the sleeve part is to first offer sufficient axial resistance to movement of the ring part when the latter is engaged by the nut to develop inwardly acting radial components of force between the nut and the ring to induce constriction of the ring and its circular cutting edge 12, then secondly to yield both radially and axially to permit and induce inward radial and forward axial movement of the cutting edge into the wall of the tube so that the edge may turn up a ridge R of appreciable size, Fig. 3. Withal the sleeve part reacts between the nut and the body and effects a fluid tight seal with the rearward face of the body, and, as the sleeve part is foreshortened and buckled inwardly, cf. Figs. 2 and 3, it preferably forms a fluid tight seal with the ridge R and the adjacent wall of the tube. Conversely and complementarily the offices and functions of the ring part will be seen to include the transmission from the nut to the sleeve of axial components of force to compel the fluid seal between the front, preferably flat face of the anchor portion of the sleeve and the body and to foreshorten the sleeve and concurrently to transmit radial components of force from the nut to the rearward end of the sleeve to induce its inward yielding and deflection incident to its foreshortening and/or buckling into sealing and gripping engagement with the tube and ridge while it is being foreshortened. A further function of the sleeve is, preferably, that it "bottoms" on the ridge and tube in the sense of affording a sharp increase in resistance to movement of the nut and ring when it has been foreshortened and buckled as shown in Fig. 3 thereby limiting the cutting action of the edge 12 and notifying the operator making the joint that the desired joint has been sufficiently made by reflecting a sharp increase in wrench torque applied to the nut.

Turning now more particularly to the structure of the element E, the ring 10 thereof has a cylindrical bore 13 which terminates at its forward end in the annular edge 12 which is circular, normal to the axis of the element and of diameter, preferably just neatly clearing the O. D. of the tube T and defined at the intersection of the forward end of the bore with the steeply pitched conical surface 14; the latter being pitched at about 80° to 75° from the same axis whereby to incline rearwardly and outwardly from the edge 12 about 10° to 15° from the plane of the edge normal to the axis of the element. The edge 12 and the adjacent stock of the ring therefore comprise in effect an annular cutting tool with about 10°–15° rake angle, about 75° to 80° cutting angle and, initially, with only a nominal relief angle and clearance, regarding the tube as the work and the ridge R as the chip. As will presently appear, the ring 10 is rolled forwardly in the operation of my invention to provide a desirable relief angle and clearance for the cutting edge 12. Preferably the surface 7 of the ring is pitched at about 45° so that when and as forcible advancement of the nut toward the body is induced the ring, being first engaged by the shoulder 6 of the nut at the outer rearward corner 3 of the ring at the "top" of its shoulder 7, will be constrained to move and roll forwardly and radially inwardly and with the marked forward rolling and tipping action as described in my co-pending application, cf. Figs. 2 and 3. This form of my invention tolerates reasonable departures from true conicalness of the surfaces 6 and 7 so long as such departures do not deleteriously modify the operation and results of my invention as revealed in this specification as a whole; it being recognizable, of course, that the differential angle between the surfaces 6 and 7 permits and invites the ring to be rolled forwardly, decreasing somewhat the rake of the surface 14 and providing a relief angle at the forward end of the bore 13 adjacent the edge 12. The rake of the face 14 facilitates the cutting action of the edge 12 when the ring is caused to have these combined movements, causing the edge 12 to bite into the external surface of the tube and cut and turn up the ridge R with greatly increased effectiveness and facility. The height and volume of the ridge R and consequently the depth of the cut into the tube T is restricted, inter alia, by the radial dimension of the raked face 14, i. e. by the diameter of the bore 15 of the sleeve 11 adjacent the face 14. For convenience and economy of manufacture the bore 15 may be of uniform diameter as shown.

Radially outward of the edge 12 the ring 10 takes its maximum thickness and bodily mass whereby to overlie the edge and the face 14 both forwardly and rearwardly and afford good strength and support for the edge 12 as a cutting tool and to back up and support the rearward end of the sleeve 11 and to impose radial pressure upon it and upon the ridge R when the same is trapped and confined between the face 14 and the rearward end of the inwardly buckled or deflected sleeve 11 as shown in Figure 3. The external surface of the ring 10 may, to conserve radial space, be cylindrical as shown for a limited distance forwardly of the corner 3 at the "top" of the shoulder 7; the corner 3 being annular and lying in a plane normal to the axis of the ring only a little rearwardly of the plane of the edge 12 whereby to afford good leverage to initiate the rolling of the ring, and after rolling, Fig. 3, a wide bearing between the nut and the ring at and all around the points from which the radial and axial components of force reaching the edge emanate. The mean length of the ring, as the drawings fairly show, is preferably about equal to or even a little less than the full thickness of the ring. I have observed that the rolling action of the ring 10 is such in this preferred form of my invention, cf. Figs. 2 and 3, that when the initial differential angle between the shoulders 6 and 7 is about 20° and the rake of the face 14 is about 10° to 12° the face 14 will stand about normal or retain a slight rake at the end of the rolling and cutting action as shown in Figure 3 while the shoulder 7 of the ring will have been rolled to substantial coincidence with the lesser pitch of the shoulder 6. Figure 3 also suggests as I have observed that the initial rolling of the ring and concomitant constriction of the cutting edge 12 provides an effective relief angle and clearance between the bore 13 and the surface of the tube rearwardly of the edge to initiate and facilitate a fine cutting action, especially when the face 14 is well raked; the forward end of the bore 13 taking conical form behind the edge as the constriction of the edge and cutting action proceeds. The matter of choice of materials for the coupling element in relation to the material of the tube to be coupled and the desirably greater hardness of the edge 12 than the hardness or softness of the tube is discussed more fully below.

The sleeve part 11 of the element E in this form of my invention preferably has a radially thickened forward anchoring portion 8 with its forward face turned substantially smooth and disposed normal to the axis of the element for flush sealing engagement with the face 2 of the body. The thickened portion 8 tends to restrain the forward end of the sleeve 11 from radial expansion or contraction when the element E is worked forcibly between the nut and body. When the nut first engages the coupling element and especially before the edge 12 is forced into engagement with the tube the element tends to be rotated by the nut except as such rotation is resisted by friction and/or seizing between the rearward face 2 of the body and the forward face of the anchor portion 8 of the sleeve. This initial frictional engagement is accompanied by substantial pressure and relative motion between these faces with the beneficent result that tool marks and other small surface irregularities on these surfaces are mutually worked down or off and a good fluid tight joint between them is effected. My preference is that these faces be given no special anti-friction treatment or characteristic and tend to develop after limited relative seating movement, and before substantial cutting action by the edge 12 has taken place, more resistance to rotation of the element E than the rotative tendency that the nut induces through engagement between the shoulders 6 and 7; a condition which is encouraged by cadmium plating the surface 6 of the nut to facilitate its freer sliding both axially and circumferentially over and around the corner 3 and the surface 7 of the element E.

Between the anchoring portion 8 and the ring 10 the sleeve comprises a thin walled tubular, so-called bridge or resistantly yieldable portion 9 which is preferably several times longer than its wall thickness with its bore 15 exceeding the outside diameter of the tube by approximately twice the radial dimension of the face 14 to permit radial inward yielding and/or buckling of the rearward part of the bridge and radial inward and axial forward cutting movement of the edge 12 until the rearward end of the bridge bottoms on or approaches substantial contact with the ridge R as the same is being or has been turned up across the face 14. The bridge portion 9 is preferably about ¼ to ⅕ as thick as the ring 10 and joins the ring radially inwardly of the corner 3 so that its initial axial reaction against the ring develops a counterclockwise (as viewed in Figs. 2 and 3) couple between the corner 3 and the rearward end of the bridge which tends to bring about the forward rolling of the ring and constriction of the edge 12 and the inward deflection and then buckling of the bridge. The bridge has sufficient initial axial strength to provide this initial reaction against the ring and has sufficient radial weakness to facilitate the rolling and constriction of the ring. It is also characteristic of the bridge as it is proportioned and disposed in this form of my invention that its axial strength in resistance to forward motion of the ring decreases as inward deflection and/or buckling proceeds whereby to admit forward cutting motion as well as radial inward motion of the edge 12 into the tube; the bridge, however, as it is buckled and foreshortened under the forcible influence of the nut through the ring, still offers sufficient axial reaction between the body and the ring to maintain a fluid tight joint between the anchor and the body and also to limit forward movement of the ring to substantially less movement than the forward motion of the nut so that the shoulder 6 of the nut has a differential motion over the corner 3 and shoulder 7 to effect a strong bodily constriction of the ring upon the tube while the forward and rolling motions and cutting actions proceed.

In this preferred form of my invention there is provided at and integral with the rearward inner end of the ring 10 a short, thin-walled rearward annular extension 17 whose bore is coextensive with the bore 13 of the ring and whose external cylindrical surface joins the lower part of the camming shoulder 7. The outer rearward corner 18 of the extension 17 is preferably rounded or tapered off for non-scuffing and delayed engagement with the lower part of the camming shoulder 6 of the nut. The extension 17 is so short that the corner 18 is substantially spaced from the shoulder 6 when the corner 3 of the ring is fully engaged, see Fig. 2, so that the corner 18 is not engaged until the nut has moved forwardly appreciably with respect to the center of mass of the ring and has well initiated the ring rolling and edge constricting and cutting motions described above. As the nut is advanced with respect to the ring and the ring is rolled forwardly the forward part of the extension 17 first tends to be raised a little from the tube, and about coincidentally the shoulder 6 contacts the corner 18 and begins to constrict it inwardly, forcing the rearward end of the extension inwardly and forwardly toward the tube. As the cutting action of the edge 12 and the buckling action of the bridge proceed and come to intended fulfillment the rearward part of the extension 17 is strongly constricted under the rearward part of the shoulder 6 and forcibly constricted upon and into tight engagement with the tube, Fig. 3. The constriction of the rearward part of the extension 17 with the final rolling of the ring tends to bring the exterior surface of the extension into conical alignment with the shoulder 7 which has been rolled to substantial conformity with the shoulder 6. The final constriction of the extension 17 takes place as the ring 10 has its last increments of forward motion so the inner rear part of the extension 17 exerts a final forward working and wiping, as well as constricting, action and effect on the tube wherewith to cause a firm, relatively wide vibration damping grip behind the ring proper and rearwardly remote from the cut that the edge has made in the tube wall. As a result, as shown in Fig. 3, the element E finally acquires multiple annular gripping engagements with the tube both before and behind the ridge R and the cut affected by the edge 12 wherewith to add widespread lateral firmness and distributed security to the mechanical strength of the cut engagement. The last increments of differential forward motion of the nut relative to element E as a whole induce the final increments of radial constriction of all the parts of the element from the buckle of the bridge rearwardly into their worked and substantially integrated relation to the tube as shown in Figure 3. These worked parts of the element E having been worked and stressed beyond their elastic limits persist in their "integrated" relation to the tube during subsequent disconnection and recouplings.

The material of which the coupling element may be made admits of a considerable choice depending in part upon the material and character of the tube to be coupled as well as the materials that are desired to be employed in the nut and body. My greater preference is to use S. A. E. 1117 steel for the stock of the coupling element because it is freely machinable and admits of case or surface hardening throughout all parts of the element including the bridge as well a the cutting edge, without deleterious impairment of the flexibility and workability of the flexed and worked parts characteristic of the mode of operation of my coupling element. Using S. A. E. 1117 steel I do not necessarily harden the coupling element, other than work hardening by the necessary machining, so long as its cutting edge is harder than the tube to be cut, or, as in the form of my invention shown in Fig. 4 is not required to cut the tube. With steel or stainless steel or other harder tubes the wholly surface hardened S. A. E. 1117 steel coupling element E provides for the form of my invention shown in Figs. 1–3 a satisfactory cutting edge and preserves desirable workability in the other parts of the element. My lesser preferance is to use other free machining steels for the coupling element E and, when used to cut pipe or tubes that are harder than the unhardened element, to confine the hardening of the element to limited areas adjacent the cutting edge or edges. Using aluminum body, nut and tube, or steel or brass nuts and bodies with copper tube, for example, the coupling element E may be made of such steel and not hardened so long as it is of greater hardness than the tube to be coupled. On steel tubes I may use a steel coupling element of similar hardness but of free machinability, which after being machined and formed is given a light case hardening preferably only on the forward surface of the bore 13 as in the shaded area 16 as by cyaniding and carbonitriding to have a case of as little as one to two thousandths inches deep. Dealing with stainless steel tubing, I find it practicable to harden the cutting edge and area 16 more deeply and to a greater degree of hardness while largely avoiding hardening of the bridge and the rest of the coupling element. Confining the hardening to the limited area of the surface of the bore may be done by copper plating the whole element lightly and then scuffing off the plating adjacent the edge in the bore as at 16 whereby to leave the bore surface uncoated and thereby exclusively exposed to the cyaniding or other hardening treatment. Alternatively the coupling element E may be completely formed and machined and then a rubber tube inserted into the bore and inflated to have intimate contact with the forward portion thereof. The whole element except the forward portions of the bore 13 in contact with the inflated tube may then be lightly copper plated and become resistant to cyaniding, but the forward portion of the bore at and immediately behind the edge 12 will be free of plating and therefore exposed to the cyaniding and hardening treatment.

To facilitate understanding and practice of my invention an example of size and proportion of the coupling element of a preferred form of my invention is stated by way of further illustration and exemplification, as follows:

For ½" O. D. tube the diameter of the edge 12 and bore 13 need exceed ½" only by enough to take care of variations in commercial tolerance of the tube and coupling element to afford a free sliding fit. The O. D. of the anchoring portion 8 is about .670" and of the ring 10 is about .680". The portion 8 is about .06" long and the length of the bridge on the outer surface is about .110" long, and, the sleeve as measured along the bore 15 from the face 14 to the forward end is about .190" long. The radial depth of the surface 14, i. e. the height of the bridge above the edge 12 is about .020" to .030", except as the same may be reduced somewhat to limit the cut to preserve extra thin-walled tubing. The thickness of the bridge is about .016" to .018" and the depth of the groove above the bridge between the outer part of the ring and the anchor is about .038″ to .048″ below the top of the ring. The outer cylindrical surface of the ring is about .02″ to .03″ long. The overall length of the ring proper is about .09″ and not much greater than or substantially the same as its maximum thickness. The extension 17 is about .040″ to .050″ long and about .018″ thick. While the drawing in Figure 2 is not necessarily exactly at scale, I have undertaken to make it correspond substantially to the dimensions and proportions here given. For tubes of greater and smaller size my experience has been that all the dimensions above stated should not necessarily be modified proportionately for the best practice of my invention. For example in making a coupling element for a one inch tube the bores and the external diameters of the ring and abutment might well be approximately doubled in respect to the ½″ size and the overall length might be moderately increased as in the anchor and ring, but the length and thickness of the bridge and its spacing from the tube may well be kept about the same as in the ½″ size although the mean diameter of the bridge would have to be approximately doubled as compared with the ½″ size. It will also be appreciated that the length of the bridge, while maintaining its desired relative length and thickness, that the rearradial spacing particularly of the rearward end of the bridge from the edge 12 may and preferably should be modified to increase or decrease the depth of the cut desired by the edge 12 with due regard to the wall thickness and quality of the material of the tube to be coupled and the service and pressure to which the coupling is to be subjected.

The practice and operation of this form of my invention comprises that the parts be assembled in the relation and position shown in Figs. 1 and 2; the forward end of the tube and the forward end of the coupling element E abutting the body, the camming shoulder 6 of the nut contacting the outer corner 3 of the shoulder 7 of the ring and the edge 12 substantially contacting the external surface of the tube. Thereupon the nut is forcibly advanced toward the body as through the threaded engagement therebetween and, consequently, the ring 10 is rolled forwardly and its edge 12 is simultaneously tended to be constricted inwardly and advanced axially relative to the tube and the body whilst the bridge 9 yieldingly resists axial movement of the ring sufficiently to compel its radial constriction and radial constriction of the edge 12. As the rearward end of the bridge yields to inward deflection and/or deflection and inward buckling with the constriction of the ring and cutting edge, axial forward movement of the ring and edge also takes place. Cutting engagement between the edge 12 and the tube begins at once the edge is constricted into cutting engagement therewith and may and preferably does continue under the forcible urging of the nut until bottoming occurs between the rearward end of the bridge and the ridge R as the latter is turned up by the edge 12. A direct incident of the buckling, cutting and gripping action is that the forward end of the element E is forced into fluid tight sealing relation with the rear face 2 of the body, and the rearward end of the bridge as well as the edge 12 and face 14 and the forward part of the bore 13 have fluid tight sealing contact and engagement with the tube while especially the edge 12, face 14 and the forward end of the bore 13 have and acquire a strong blow-out proof mechanical engagement with the tube. Inter alia, the rearward extension 17 of the ring is constricted into tight engagement with the tube as more fully described above.

The coaction of such factors as the initial differential angle between the shoulders 6 and 7, the angle of pitch of the shoulder 6 of the nut, the rake of the face 14 and, the quality of the yielding resistance of the bridge contribute essentially and substantially to the advantages and results of this form of my invention. The angle between the shoulders 6 and 7 tends to measure the extent of the rolling of the ring while the pitch of the shoulder 6 tends to measure the apportionment between the radial and axial components initially and finally imposed on the ring as well as the differential axial motion between the nut and the ring and therefore the mechanical advantage the nut has over the ring, i. e., over the working of the whole coupling element and the cutting and gripping actions of the element on and upon the tube. Concomitantly the rake of the face 14 contributes to the ease and efficiency of the cutting action and reduces the effort, i. e. wrench torque, required for work of cutting the tube and turning up the ridge. Correlated with promoting these actions and effects the bridge reacts against the ring to first induce and initiate the rolling of the ring which in turn deflects the rearward end of the bridge inwardly and initiates the buckling of the bridge that in turn causes the ring and more especially the edge 12 to gain forward motion along with its radial inward motion to effect the desired cutting action.

While I have illustrated and described a preferred form of my invention, changes, other modifications and improvements will occur to those skilled in the art who come to understand its uses and advantages, and therefore I do not care to be limited to the forms or illustrations of my invention herein specifically disclosed nor in any manner inconsistent with the promotion of progress in this art marked by my invention.

I claim:

1. The combination in a tube coupling of a body to the rearward end of which the forward end of a tube is coupled with said body; the tube having a first annular groove with a tapered rearward surface and an abrupt forward face spaced from the extreme forward end of the tube and having a second annular groove spaced rearwardly from said first named groove, a coupling member having a bore for the tube and forcibly coacting with said body, and a deformed coupling element forcibly gripped between said member and body and gripping the tube and having a fluid tight engagement with the tube and with said body, said member having a forwardly and outwardly inclined camming shoulder engaging the rearward end of said element, the rearward end of said element comprising a short thick substantially inflexible ring-like part with a short, thin inwardly flexed and rearwardly disposed extension part, both parts having a common outward and rearward inclined surface engaged by and constricted by the camming shoulder of said member and said ring-like part having an inwardly and forwardly tapered bore forcibly engaging said rearward tapered surface of said first groove and stressing said tube in radial compression within said bore and having a substantially radially disposed inner forward face defining an edge at the forward end of said bore and forcibly engaging the forward face of said groove and stressing said tube in axial compression toward said body, said edge being embedded in said first-named groove in the tube radially inward and substantially under said camming shoulder, said extension part having its rearward end forcibly engaging said tube in said second groove and stressing said tube in compression under a rearward portion of said camming shoulder, said element also comprising a flexible thin walled tubular part integrally formed with said ring-like part and extending forwardly therefrom from above said inner face and having an annular portion buckled inwardly upon the tube forwardly of and adjacent said first groove and compressing said tube longitudinally adjacent a forward portion of said camming shoulder.

2. The combination in a tube coupling of a body to the rearward end of which the forward end of a tube is coupled with said body; the tube having a first annular groove with a tapered rearward surface and an abrupt forward face spaced from the extreme forward end of the tube, and the tube having an annular ridge of appreciable size adjacent the forward face of said groove, the tube having a second annular groove spaced rearwardly from and adjacent said first groove, an abutment associated with said body engaging the extreme forward end of the tube, a coupling member having a bore for the tube and forcibly coacting with said body, and a deformed coupling element forcibly gripped between said member and body and mechanically gripping the tube and having a fluid tight engagement with the tube and with said body, said body having a rearward surface facing and engaging the forward end of said element, said member having a conical forwardly facing surface engaging the rearward end of said element, the rearward end of said element comprising a short thickened ring-like part of length approximating its thickness and an inwardly flexed and rearwardly disposed part shorter and thinner than said ring-like part, both parts having a common outward and rearward substantially conical surface engaged by said member and said ring-like part having an inwardly and forwardly tapered bore forcibly engaging said rearward tapered surface of said first groove and stressing said tube in radial compression within said bore and having a substantially radially disposed inner forward face defining a cutting edge at the forward end of said bore and forcibly engaging the forward face of said groove and the rearward side of said ridge and stressing said tube in axial compression against said abutment and having an outer part overhanging said face and confining and compressing said ridge, said cutting edge being embedded in said groove in the tube and said outer part compressing said ridge radially inward and substantially under a portion of said conical surface of said member, said rearwardly disposed part being forcibly constricted in said second groove and stressing said tube in radial compression under a rearward portion of said conical surface of said member, said element also comprising a flexible tubular part integrally formed with said outer part of said ring-like part and extending forwardly therefrom from above said inner face and having an annular rearward portion buckled inwardly upon the tube adjacent said ridge and in tight engagement with the tube on the forward side of said ridge and stressing the tube in compression, said element being stressed in compression axially between said member and said body and stressed in compression radially between said member and said tube.

3. A tube coupling comprising a body having a rearward face and a bore with which a tube is to have fluid connection, a coupling member having a bore through which the tube passes and having a forwardly facing outwardly flaring camming shoulder spaced from said body and movable toward the same, a coupling element having a rearwardly disposed radially and forwardly thickened axially inflexible ring part with a bore encircling the tube, said coupling element lying between said face and said shoulder, and said ring part having an inner forwardly facing substantially radial annular surface forming with said bore in the ring part an internal cutting edge and having a thickened annular radially outward portion overlying said surface and said edge and having a short flexible, inwardly and rearwardly disposed annular extension spaced longitudinally behind said inner surface and said edge, said coupling element also having a forward end engaging said face and an axially flexible, thin walled tubular part between said end and said ring part and yieldably resisting longitudinal movement of said ring part toward the body, said flexible tubular part lying radially between the said inner surface and the outer part of said thickened portion and being spaced from said tube, said ring part having a forwardly and outwardly inclined rearward surface rising from the forward part of said extension and of greater angle than and juxtaposed to said camming shoulder with the outer margin of said inclined surface near the radial plane of the said inner radial surface and proximate said camming shoulder, said extension lying within and being engageable by the rearward part of said camming shoulder, said flexible part resisting forward movement of said ring part of the coupling element to induce forward rolling motion of the ring part and constriction of the cutting edge into the tube and thereby flexing and weakening the flexible part and thereafter buckling the same under axial movement of the ring part of the coupling element toward said face of the body with axial and radial cutting action of said edge into the tube, and said shoulder advancing relative to said extension with the rolling motion of said ring part and forcibly constricting said extension into tight engagement with the tube behind and spaced from said cutting edge.

4. The coupling of claim 3 in which said extension is spaced from contact with said camming shoulder when said shoulder first engages the said inclined surface of the ring part whereby appreciable cutting action is had before said extension forcibly engages the tube.

References Cited in the file of this patent
UNITED STATES PATENTS

| Number | Name | Date |
|---|---|---|
| 2,171,217 | Kreidel | Aug. 29, 1939 |
| 2,233,214 | Lamont | Feb. 25, 1941 |
| 2,452,278 | Woodling | Oct. 26, 1948 |
| 2,453,024 | Lomelino | Nov. 2, 1948 |
| 2,522,785 | Hanson | Sept. 19, 1950 |
| 2,585,453 | Gallagher | Feb. 12, 1952 |
| 2,641,487 | LaMarre | June 9, 1953 |